Patented Nov. 11, 1930

1,780,976

UNITED STATES PATENT OFFICE

GEORG KRÄNZLEIN AND FRITZ ROEMER, OF FRANKFORT-ON-THE-MAIN-HOCHST, AND ERICH KRONHOLZ, OF BAD SODEN-ON-THE-TAUNUS, GERMANY, ASSIGNORS TO GENERAL ANILINE WORKS, INC., OF NEW YORK, N. Y., A CORPORATION OF DELAWARE

ACID WOOL DYESTUFFS OF THE ANTHRAQUINONE SERIES

No Drawing. Application filed December 19, 1928, Serial No. 327,182, and in Germany December 23, 1927.

The present invention relates to acid wool dyestuffs of the anthraquinone series and to a process of preparing them.

We have found that valuable dyestuffs of a good leveling power are obtained, by causing a 1-amino-4-halogen-anthraquinone-2-sulfonic acid to react with a base of the general formula:

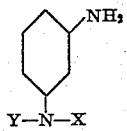

wherein X stands for an alkyl- or aralkyl group and Y stands for an aliphatic acyl-residue, in the presence of copper or a copper compound while heating.

The new dyestuffs correspond to the general formula:

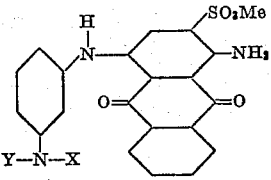

wherein X stands for an alkyl or aralkyl group, Y for an aliphatic acyl-residue and Me for a metal or for hydrogen.

The following example serves to illustrate our invention, but it is not intended to limit it thereto, the parts being by weight.

(1) 40 parts of sodium 1-amino-4-bromanthraquinone-2-sulfonate are heated on the water-bath together with 25 parts of meta-amino-methylacetanilide, 10 parts of sodium bicarbonate and 10 parts of a copper sulfate solution of 10% strength in 800 parts of water to 60° C. to 80° C. and the whole is kept at that temperature for 6–8 hours. The condensation product is, if required, purified by re-dissolving it, and the dyestuff is obtained in a beautiful crystalline form, being, when dry, a blue powder and dissolving in water to a blue solution.

Instead of meta-amino-methylacetanilide there may also be used meta-amino-methyl-formanilide in the preceding example, there may likewise be used other alkyl derivatives with the same advantage, such as for instance the bases which are ethylated or benzylated or substituted by a hydro-aromatic residue in the acyl-amino-group.

In the following claims the term "copper catalyst" is intended to comprise not only the metal itself but also copper compounds, particularly its salts, and the term "sulfonic acids" is intended to comprise also the salts thereof.

We claim:

1. As new products, the dyestuffs of the following constitution:

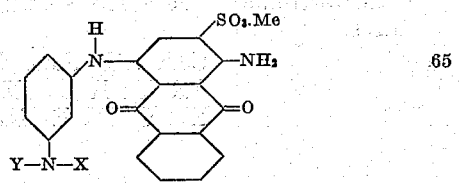

wherein X stands for an alkyl or aralkyl group, Y for an aliphatic acyl-residue and Me for a metal or for hydrogen, said dyestuffs being, when dry, a blue powder and dissolving in water to a blue solution.

2. As new products, the dyestuffs of the following constitution:

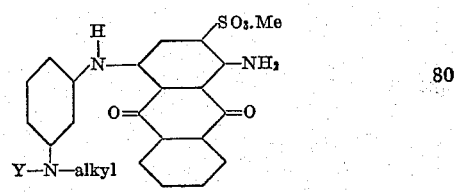

wherein Y stands for an aliphatic acyl-residue and Me for a metal or for hydrogen, said dyestuffs being, when dry, a blue powder and dissolving in water to a blue solution.

3. As new products, the dyestuffs of the following constitution:

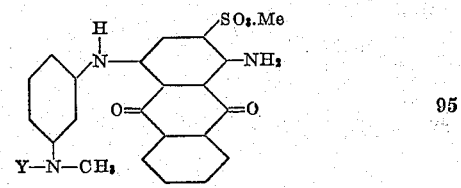

wherein Y stands for an aliphatic acyl-residue and Me for a metal or for hydrogen, said dyestuffs being, when dry, a blue powder and dissolving in water to a blue solution.

4. As new products, the dyestuffs of the following constitution:

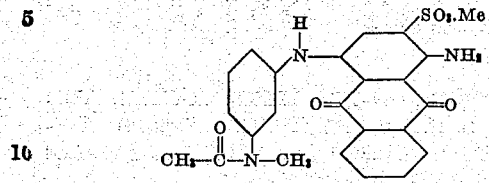

wherein Me stands for a metal or for hydrogen, said dyestuffs being, when dry, a blue powder and dissolving in water to a blue solution.

5. As a new product, the dyestuff of the following composition:

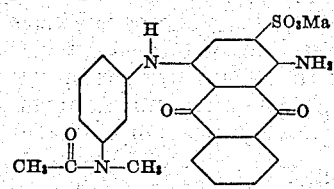

said dyestuff being, when dry, a blue powder and dissolving in water to a blue solution.

In testimony whereof, we affix our signatures.

GEORG KRÄNZLEIN.
FRITZ ROEMER.
ERICH KRONHOLZ.

Certificate of Correction

Patent No. 1,780,976.                                         Granted November 11, 1930, to

GEORG KRANZLEIN ET AL.

It is hereby certified that error appears in the printed specification of the above numbered patent requiring correction as follows: Page 2, first line of formula, claim 5, for the symbol "$SO_3Ma$" read $SO_3Na$; and that the said Letters Patent should be read with this correction therein that the same may conform to the record of the case in the Patent Office.

Signed and sealed this 30th day of December, A. D. 1930.

[SEAL.]
                                                                        M. J. MOORE,
*Acting Commissioner of Patents.*